Patented Jan. 22, 1935

1,988,484

UNITED STATES PATENT OFFICE 1,988,484

COLORED RUBBER PRODUCT AND METHOD OF MAKING SAME

Elmer G. Croakman, Akron, Ohio, assignor to National Aniline & Chemical Company, Inc., New York, N. Y., a corporation of New York No Drawing. Application November 10, 1927, Serial No. 232,461

11 Claims. (Cl. 18—50)

This invention relates to the art of coloring unvulcanized rubber substances such as rubber, gutta-percha, balata, synthetic rubber, and other solid materials commonly classed under the term "rubber"; and to the colored products resulting therefrom or comprising the same, both before and after vulcanization.

It is well known that under suitable conditions certain organic dyes can be used for coloring or dyeing unvulcanized rubber substances and rubber compounds or compositions. As heretofore practiced, however, the organic dyes thus employed have been incorporated or compounded in their normal state of oxidation with the raw rubber, or the unvulcanized rubber mix, and the resulting colored product subsequently used or treated in any desired way known to the art. Unvulcanized colored rubber products thus obtained have been ordinarily subjected to vulcanization at a suitable temperature in the presence of vulcanizing ingredients and a suitable accelerator.

In my copending application Serial No. 232,460, filed on even date herewith for "Colored rubber product and method of making same", there is described and claimed the coloring of raw rubber material by addition thereto of a dyestuff in the leuco state, and developing the color of the dyestuff by oxidation.

According to the present invention, it has been found that when a mass of solid unvulcanized rubber substance and the leuco compound of a dye, or solution of the leuco compound of a dye are mixed, the leuco compound readily and evenly disseminates and distributes itself throughout the rubber mass, and upon exposure of the mass thus treated to the air or other oxidant, a colored rubber product is produced. Improved results can be obtained in the coloring of solid rubber and related products by incorporating or compounding therewith in the unvulcanized state, and with or without the addition of a substratum, and/or a vulcanizing ingredient, and/or an accelerator, a reducible dyestuff in the leuco state, i. e., a dyestuff in a sub-normal state of oxidation and which upon exposure to air is oxidized to the dyestuff proper. The resulting mixture upon exposure to the air before, during or after vulcanization, yields a colored rubber product which is fast to light and washing and does not bleed. Further, the unvulcanized products thus treated in general withstand vulcanization at vulcanization temperatures with little, if any, injury to the dyestuff or the rubber. In some instances, however, the colored vulcanized rubber is not of the same shade or tint as the unvulcanized product.

Of the known classes of dyestuffs which are generally employed in the leuco state in dyeing textile fibres and other material may be mentioned the vat dyes, for example, the anthraquinone vat coloring matters and the indigoid coloring matters; and the sulfur dyes. The anthraquinone and indigoid vat dyes upon solution or treatment with alkaline hydrosulfite solution are reduced to the leuco state, while the sulfur dyes are reduced to the leuco form by treatment or solution in sodium sulfide or in sodium hydrosulfite solutions.

The following examples will illustrate the invention, it being understood that the invention is not limited thereto. The parts are by weight.

*Example 1.*—To a rubber mix consisting of

| | Parts |
|---|---|
| Pale crepe | 100 |
| Zinc oxide | 15 |
| Sulfur | 4 |
| Diphenylguanidine | ½ | on a warm mixing mill there is slowly added a solution comprising one-quarter part of Thional green 2G (Schultz No. 746, prepared from 1 - phenylamino-4'-hydroxyphenylamino-naphthalene-8'-sulfonic acid and sodium polysulfide; cf. U. S. P. 776,885) in 5 parts of a 15 percent sodium sulfide aqueous solution and 10 parts of Turkey red oil. The unvulcanized mixture upon exposure to air is colored a light green shade. Upon being cured in a mold for 75 minutes at a temperature corresponding to 40 lbs. steam pressure (about 140°–141° C.), a vulcanized rubber product having a similar light green shade is produced.

By using, in this example, one part of the Thional green 2G reduced to the leuco state in place of one-quarter part, a rubber product having a dark green shade is obtained both before and after vulcanization.

*Example 2.*—The initial materials, the specific conditions, and the procedure are the same as given in Example 1, except that no Turkey red oil is used, and in place of one-quarter part of Thional green 2G there is used a solution comprising three-quarters part of Indanthrene blue R (Schultz No. 837) dissolved in 15 parts of 3 to 4 percent alkaline sodium hydrosulfite solution. During the addition of the leuco-dye to the rubber mix, most of the water is evaporated off due to the heat of the mill. The rubber mixture, due to exposure to air, is colored a uniform blue shade which, after vulcanization, produces a product having a similar shade which is fast to light and does not "bleed".

In a similar manner, it has been found that both unvulcanized and vulcanized rubber and rubber products covering a wide range of shades can be produced by the use of other dyes in their leuco state. For example, satisfactory results have been obtained with Immedial Indone (Schultz No. 733, Ger. Patent No. 199,963), Indanthrene green B (Schultz No. 765), Indanthrene violet 2R (Schultz No. 767), Indanthrene dark blue BO (Schultz No. 763), etc. Instead of the leuco compounds of the dyes mentioned in the above examples, a mixture of two or more of the leuco compounds of the above dyes or of any of the leuco derivatives of the reducible dyestuffs of the same or different series may be used. In this way various shades and depths of color may be obtained in the colored product.

It is to be understood that the rubber can be compounded with various proportions of the leuco dye, or a mixture of different leuco dyes, and with or without the presence or addition of a substratum, a dispersing agent for the dye, a vulcanizing agent, an accelerator, or other ingredients employed in the manufacture of unvulcanized or vulcanized rubber products; and that the order of mixing the materials or compounding the rubber may be varied in any desired or suitable manner.

The order in which the steps of oxidation of the leuco dyestuff and vulcanization of the rubber are carried out may be varied, so that the leuco compound of the dye may be oxidized before vulcanization, or, by properly adjusting the additional quantity of reducing agent present with the leuco compound, and carrying out the vulcanization in the absence of air or other oxidant, the oxidation may be prevented from occuring during vulcanization, and be produced after vulcanization, or the steps of vulcanization and oxidation may be carried out simultaneously.

It may be further noted that instead of Turkey red oil which is used as a dispersing agent for the leuco compound, enabling the use of less water in the incorporating solution, other similarly acting materials may be used.

The term "unvulcanized rubber substance" has been used in the specification and claims to denote such substances as true rubber (caoutchouc), crepe rubber, artificial rubber, gutta-percha, coagulated latex, and the like; all of which substances are solid and exhibit the characteristic properties of rubber before vulcanization, and excludes liquid or viscous rubber substances such as latex. The term "rubber material" has been used as a generic expression to denote the above solid substances either before or after vulcanization.

I claim:

1. In a process of coloring a rubber material, the improvement which comprises mixing the leuco compound of a dye with a mix containing a solid unvulcanized rubber substance under conditions preventing oxidation of the leuco compound, oxidizing the leuco compound and vulcanizing the rubber substance.

2. In a process of coloring rubber, the improvement which comprises mixing the leuco compound of a dye with a mix containing a solid unvulcanized rubber substance under conditions preventing oxidation of the leuco compound, and simultaneously oxidizing the leuco compound and vulcanizing the rubber.

3. In a process of coloring a rubber material, the improvement which comprises mixing the leuco compound of a dye with a mix containing a solid unvulcanized rubber substance under conditions preventing oxidation of the leuco compound, vulcanizing the rubber under non-oxidizing conditions and then oxidizing the leuco compound.

4. A process of coloring rubber material which comprises mixing a solution of the leuco compound of a dye with a solid unvulcanized rubber substance, oxidizing the leuco compound contained in the resulting mixture, and vulcanizing the rubber substance.

5. A process of coloring rubber material which comprises mixing a solution of the leuco compound of a dye with a solid unvulcanized rubber substance, and simultaneously oxidizing the leuco compound contained in the resulting mixture and vulcanizing the rubber substance.

6. A process of coloring rubber material which comprises mixing a solution of the leuco compound of a dye with a solid unvulcanized rubber substance, vulcanizing the rubber substance under nonoxidizing conditions and then oxidizing the leuco compound contained in the vulcanized product.

7. A process of coloring rubber material which comprises mixing a solution of the leuco compound of a sulphur dye with a solid unvulcanized rubber substance, oxidizing the leuco compound contained in the resulting mixture, and vulcanizing the rubber substance.

8. A process of coloring rubber material which comprises mixing a solution of the leuco compound of a vat dye with a solid unvulcanized rubber substance, oxidizing the leuco compound contained in the resulting mixture, and vulcanizing the rubber substance.

9. A process of coloring rubber material which comprises mixing a solution of the leuco compound of an indigoid vat dye with solid unvulcanized rubber, oxidizing the leuco compound contained in the resulting mixture, and vulcanizing the rubber.

10. A process of coloring rubber material which comprises mixing a solution of the leuco compound of an anthraquinone vat dye with solid unvulcanized rubber, oxidizing the leuco compound contained in the resulting mixture, and vulcanizing the rubber.

11. A process of coloring rubber which comprises preparing a solution of a leuco compound of an anthraquinone vat dye by dissolving the dye in an alkaline solution of a hydrosulfite, mixing the thus prepared solution with a solid unvulcanized rubber substance, oxidizing the leuco compound contained in the resulting mixture, and vulcanizing the rubber substance.

ELMER G. CROAKMAN.